G. H. SCHANCK.
Wheel Cultivator.
No. 39,837.  Patented Sept. 8, 1863.
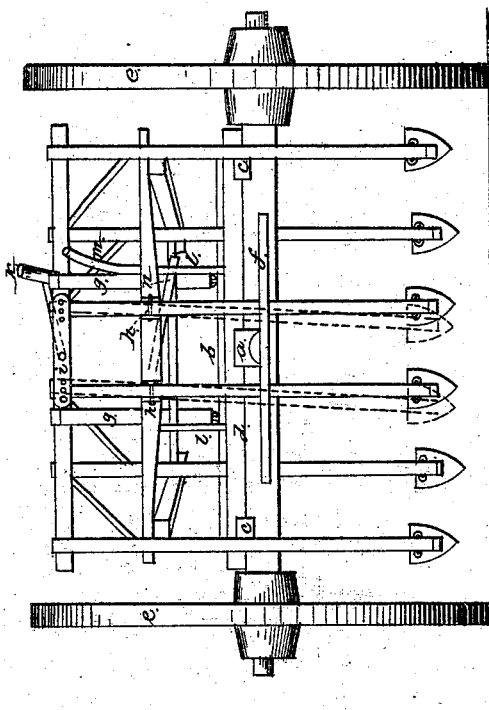
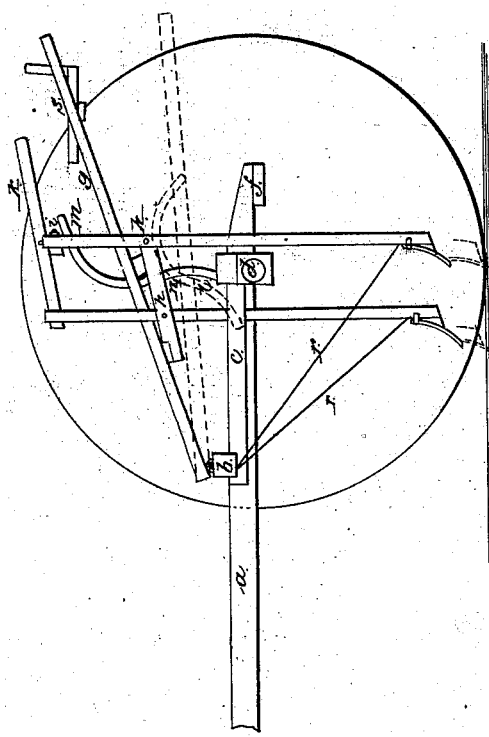
Witnesses:
Inventor:
G. H. Schanck
by his attorney
Amos Broadnax {#unused}

UNITED STATES PATENT OFFICE.

G. H. SCHANCK, OF LIBERTYVILLE, ILLINOIS.

IMPROVEMENT IN CULTIVATORS.

Specification forming part of Letters Patent No. 39,837, dated September 8, 1863; antedated April 2, 1862.

*To all whom it may concern:*

Be it known that I, G. H. SCHANCK, of Libertyville, in the county of Lake and State of Illinois, have invented a new and useful Improvement in Cultivators, which I call a "Sulky-Cultivator;" and I do hereby declare that the following is a full, clear, and exact description of the same, reference being had to the annexed drawings, making a part of this specification, and to the letters of reference marked thereon.

This machine relates to two-wheeled cultivators, in which the teeth may be easily and quickly raised from the ground and a portion of them shifted sidewise in conformity with the irregularities of the hills of corn.

To enable others skilled in the art to make and use my invention, I will proceed to describe its construction and operation with reference to the drawings.

Figure 1 is a side elevation of my improved cultivator with the position of the wheels merely indicated, that they may not interfere with the representations of the more peculiar portions of the machine; and Fig. 2 is an end elevation of the same.

The frame carrying the machine consists of a tongue, $a$, with a cross-beam, $b$, and two side beams, $c$, that are mortised into the axle $d$ of the wheels $e$. A prolongation of the tongue behind the axle supports the foot-board $f$. The two longitudinal beams $g$ are hinged or jointed to the cross-beam $b$, and carry the driver's seat $s$ and the frame to which the staffs of the cultivator-teeth are jointed. There are six teeth—two in front and four behind the axle—and they are all braced to the front beam, $b$, by the jointed rods $r$. These staffs all vibrate on their respective joint-pins $h$. The middle pair are pivoted at the top to a cross-bar, $i$, which is connected by a pitman-rod to the lever $k$, placed in a position convenient to the hand of the driver, so that he may shift them to the right or left in conformity with the irregularities of the rows under cultivation, as is indicated by the dotted lines in Fig. 2.

The cultivators are represented raised from the ground in the drawings. The vibrating frame by which they are carried is hinged to the cross-beam $b$ at the front, and is supported by the legs $l$, resting on the axle. These legs are operated by the handle $m$, and are constantly pressed into a vertical position by the spring $n$. When the handle $m$ is depressed the feet of the legs $l$ are withdrawn from the axle in opposition to the spring $n$, and the entire frame carrying the cultivator-teeth and the driver's seat is lowered upon the axle into the position indicated by the dotted lines in Fig. 1.

When it is desired to elevate the cultivators the driver rises from his seat, stands upon the foot-board, and lifts the rear end of the frame by one of the beams $g$ high enough to rest the legs $l$ on the axle, to which position they are pressed by the spring $n$.

The plate of each tooth is fastened by two bolts to a suitable casting that is secured to the bottom of the staff. I do not confine myself to any particular description of frame, but I prefer the arrangement illustrated by the drawings.

I claim as my invention, and desire to secure by Letters Patent—

Extending the hinged frame $g$ back and locating the driver's seat $s$ thereon in relation to the foot-board $f$, handle $m$, and spring $n$, as described, whereby the driver can drop the cultivator-plows with his hand, and at the same time press them into the ground or regulate their dip with his weight.

G. H. SCHANCK.

Witnesses:
ROLLIN B. GRAY,
OLIVER C. FORDHAM.